(12) United States Patent  (10) Patent No.: US 8,589,549 B1
Vermeulen et al.  (45) Date of Patent: Nov. 19, 2013

(54) METHOD AND SYSTEM FOR CUSTOMER INCENTIVE-BASED MANAGEMENT OF COMPUTING RESOURCE UTILIZATION

(75) Inventors: Allan H. Vermeulen, Seattle, WA (US); Jeffrey P. Bezos, Greater Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1952 days.

(21) Appl. No.: 11/157,635

(22) Filed: Jun. 21, 2005

(51) Int. Cl.
*G06F 15/173* (2006.01)

(52) U.S. Cl.
USPC .......................................................... 709/226

(58) Field of Classification Search
USPC .................... 709/226, 225, 224, 223; 705/14
See application file for complete search history.

(56) References Cited

U.S. PATENT DOCUMENTS

| | | | | |
|---|---|---|---|---|
| 5,951,644 | A | * | 9/1999 | Creemer ........................ 709/229 |
| 6,055,513 | A | * | 4/2000 | Katz et al. ........................ 705/26 |
| 6,516,350 | B1 | * | 2/2003 | Lumelsky et al. ............ 709/226 |
| 6,785,592 | B1 | | 8/2004 | Smith et al. |
| 6,792,399 | B1 | | 9/2004 | Phillips et al. |
| 7,130,807 | B1 | | 10/2006 | Mikurak |
| 7,263,583 | B2 | | 8/2007 | Hood et al. |
| 2001/0014868 | A1 | | 8/2001 | Herz et al. |
| 2003/0028451 | A1 | * | 2/2003 | Ananian ........................ 705/27 |
| 2004/0186905 | A1 | | 9/2004 | Young et al. |
| 2005/0005158 | A1 | | 1/2005 | Alaluf |
| 2005/0234935 | A1 | | 10/2005 | Barsness et al. |
| 2005/0240668 | A1 | * | 10/2005 | Rolia et al. .................... 709/223 |
| 2006/0248023 | A1 | | 11/2006 | Caprini et al. |

OTHER PUBLICATIONS

Luh et al., "Load adaptive pricing: An emerging tool for electric utilities," IEEE Transactions on Automatic Control, Apr. 1982, 10 pages.
New Mexico Solar Energy Association, "Interconnecting to the grid in New Mexico," Oct. 2002, 3 pages, available at www.nmsea.org/Grid_Interconnection/Interconnection.htm.
Electric Power Research Institute, "New principles for demand response planning," Mar. 2002, 97 pages.
Discount Long Distance Digest, "RateXchange launches auctions," Apr. 11, 2000, 2 pages, available at www.thedigest.com/more/115-34.html.
ECI Telecom Press Release, "ECI Telecom chosen by NetAmerica. com (RateXChange) to deliver digital cross connect carrier-class solutions," Apr. 18, 2000, 2 pages, available at www.ecitele.com/News/Press%20Releases/Pages/April182000.aspx.
Invisible Hand Networks, Inc., "Bandwidth market report, Nov. 2004," 2 pages, available at web.invisiblehand.net/ihn-bmr/200411.html.

(Continued)

*Primary Examiner* — William Goodchild
(74) *Attorney, Agent, or Firm* — Robert C. Kowert; Meyertos, Hood, Kivlin, Kowert & Goetzel, P.C.

(57) ABSTRACT

A method and system for customer incentive-based management of computing resource utilization. According to one embodiment, a method may include provisioning a computing resource according to a given level of resource utilization, and dynamically predicting utilization of the computing resource that is expected to occur during a given interval of time. In response to dynamically predicting that utilization of the computing resource will be less than the given level of resource utilization during the given interval of time, the method may further include offering an incentive to a customer to utilize the computing resource during at least a portion of the given interval of time.

69 Claims, 8 Drawing Sheets

(56) References Cited

OTHER PUBLICATIONS

Invisible Hand Networks, Inc., "Merkato overview technical paper," 2002, 14 pages, available at www.invisiblehand.net/pub_dl.php?wp_id=6.

Salkever, "Trading CPU time like corn?," Business Week, Nov. 9, 2004, 2 pages.

"Spawn: A distributed computational economy," IEEE Transactions on Software Engineering, 1992, 32 pages.

U.S. Appl. No. 11/158,190, filed Jun. 21, 2005.

* cited by examiner

METHOD AND SYSTEM FOR CUSTOMER INCENTIVE-BASED MANAGEMENT OF COMPUTING RESOURCE UTILIZATION

BACKGROUND OF THE INVENTION

1. Field of the Invention

This invention relates to computing systems and, more particularly, to management of utilization of computing resources by resource users.

2. Description of the Related Art

In order to implement various business functions, many enterprises employ a substantial degree of computing infrastructure, including data storage systems, computer systems, networking and communications equipment, client hardware, etc. For example, an enterprise may deploy a substantial amount of computing resources to implement databases and applications configured to store and process data relating to inventory and catalogs, manufacturing, finance/accounting, customers, ordering, and/or any other business function pertinent to the enterprise.

In many instances, computing resources may be provisioned according to the maximum expected resource workload for a given quality of service. For example, the ability of the enterprise to receive and process customer orders placed via the internet may depend on computing resources such as internet communication bandwidth into the enterprise and available computing and storage capacity to process orders. The enterprise may wish to assure that delay experienced by customers during ordering is maintained below a certain level even during periods of high customer order volume. Correspondingly, the enterprise may provision bandwidth, computing and storage capacity associated with the ordering system according to the peak level of expected ordering activity.

However, demand for computing resources may be highly variable. For example, customer activity may follow cyclical patterns over the course of a given 24-hour period, depending on customer demographics and geography. Further, customer activity may exhibit seasonal variation or long-term trends. Additionally, demand may vary due to random or singular events. If computing resources are provisioned according to certain maximum expectations of demand, such resources may be relatively idle during periods when demand is less than the maximum. Depending on the overall pattern of demand, this may lead to significantly inefficient use of computing resources.

SUMMARY

Various embodiments of a method and system for customer incentive-based management of computing resource utilization are disclosed. According to one embodiment, a method may include provisioning a computing resource according to a given level of resource utilization, and dynamically predicting utilization of the computing resource that is expected to occur during a given interval of time. In response to dynamically predicting that utilization of the computing resource will be less than the given level of resource utilization during the given interval of time, the method may further include offering an incentive to a customer to utilize the computing resource during at least a portion of the given interval of time.

In one specific implementation of the method, the computing resource may include at least one of a storage device, a network communication device, or a computer system. In another specific implementation of the method, the computing resource may be accessible by the customer via a web services interface.

In still other implementations of the method, offering an incentive to the customer may include reducing a cost associated with the computing resource for utilization of the computing resource that occurs during the given interval of time, or offering the customer access to an expanded scope of features of the computing resource during the given interval of time.

Figure 1:
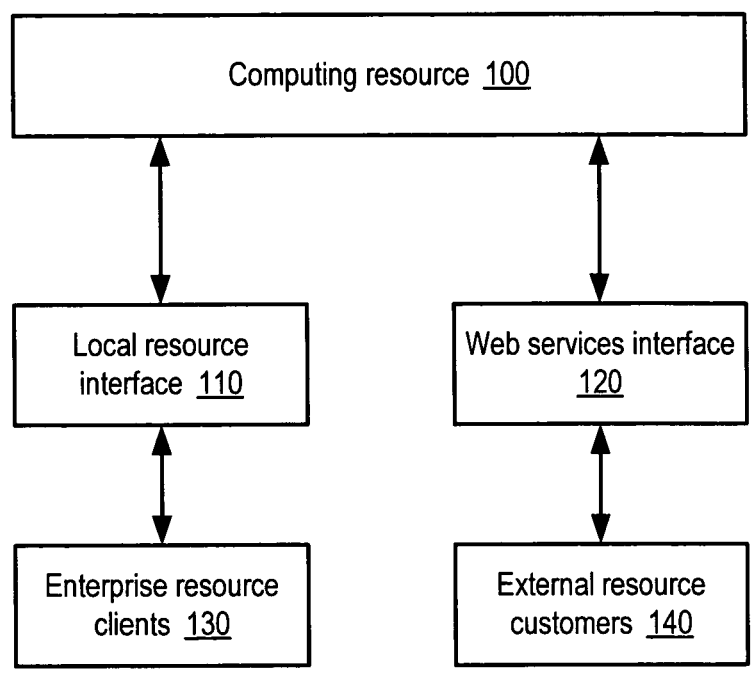
FIG. 1 is a block diagram illustrating one embodiment of a system in which a computing resource may be configured for use by both enterprise clients and external customers.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

As mentioned above, in many enterprises that employ different types of computing resources, such resources may be provisioned according to a given level of resource utilization, such as a maximum level of customer activity or a function of such a maximum level of activity, for example. The cost of provisioning such resources may thus correlate with the maximum level of resource utilization. For example, sufficient disks, server systems, bandwidth, etc. may need to be purchased, leased or otherwise provisioned to meet expectations for peak storage requirements, processing activity, network traffic and so forth.

However, actual utilization of a given computing resource at any given time may vary substantially relative to peak resource capacity. For example, an enterprise's network bandwidth utilization may vary by a factor of 9 between times of maximum and minimum utilization. If resource costs are measured relative to maximum utilization, such costs may still be incurred even when utilization is less than maximum. In such circumstances, there may be few or no incremental costs associated with utilization levels less than the maximum level. That is, the degree to which resource utilization is less than the maximum level may be considered spare, underutilized resource capacity that is available to do additional work for minimal additional cost.

As described in greater detail in the following discussion, in some embodiments, an enterprise may offer various incentives to customers to encourage those customers to utilize computing resources during times when those resources are predicted to be underutilized. For example, an enterprise may offer data storage services, generic processing services, or specialized web services to customers. In some embodiments, the enterprise may offer discounts, promotions or other incentives to such customers to utilize underutilized resources, such as by directly notifying customers in advance of the availability and terms of an incentive offer. In so doing, the enterprise may in some circumstances increase its recovery of the costs of provisioning the resources, for example by encouraging customers to pay some price for resources that otherwise may have been idle. Even incentives that do not result directly in revenue (e.g., offering resource utilization for free during certain periods) may result in indirect tangible or intangible benefits, such as increased advertising revenue due to increased web site traffic, increased visibility in the marketplace, increased customer goodwill, etc.

In addition to offering incentives based on predicted resource underutilization, in some instances an enterprise may dynamically price various computing resources. That is, the enterprise may dynamically tie the price to a customer of a resource at a given time to the predicted utilization of that resource at the given time. For example, in one embodiment the enterprise may continuously vary the price of a web services computing resource according to its predicted future level of utilization, a prediction as to whether utilization is increasing or decreasing overall, historical utilization data, or other relevant factors. Such dynamic pricing may result in greater efficiency in recovering value for resource utilization by customers, for example by balancing resource demand generated by pricing adjustments against expected underutilized resource capacity.

In the following discussion, various embodiments of computing resources are first described in detail, including an exemplary embodiment of a system configured to provide web services as a computing resource. Resource utilization and utilization dynamics are then discussed, followed by several exemplary embodiments of methods and techniques for offering resource utilization incentives to customers as well as dynamic resource pricing. However, it is noted that this organization is intended to facilitate exposition, and the embodiments described herein are not limited by section headings or the order in which the sections are presented.

Computing Resource Provisioning and Interfacing

Many enterprises employ various types of computing resources with which to conduct enterprise activity. For example, an enterprise may provision server systems and network connectivity in order to implement internal processes or applications as well as to implement services or interfaces for customers, supplier or other parties external to the enterprise. In some embodiments, an enterprise's computing resources may be configured not simply to implement the functions or applications of the enterprise, but may also be offered to clients or customers external to the enterprise for usage as determined by the external party. For example, in one embodiment a computing resource may include data storage capacity (e.g., magnetic disks, disk arrays, etc.). In one such embodiment, part of the storage resource may be configured to store enterprise data, while another part may be offered to an external customer to store data of the customer's choosing at the direction of the customer.

One embodiment of a system in which a computing resource may be configured for use by both enterprise clients and external customers is illustrated in FIG. 1. In the illustrated embodiment, a computing resource 100 is presented to one or more enterprise resource clients 130 via a local resource interface 110. Computing resource 100 is also presented to one or more external resource customers 140 via a web services interface 120. Enterprise resource clients 130 and external resources customers 140 may be referred to collectively as resource users.

Generally speaking, computing resource 100 may include any type of resource that functions in support of a computing task. For example, in some embodiments computing resource 100 may include tangible resources such as computer systems (e.g., standalone or rack-mounted systems), storage devices (e.g., magnetic/optical disk storage, tape storage, etc.), wired or wireless network communication devices (e.g., Local Area Network (LAN)/Wide Area Network (WAN) devices and/or media), input/output devices, or other types of computing devices.

In other embodiments, computing resource 100 may be configured and utilized as an abstract hardware resource rather than a specific tangible resource. For example, in various embodiments computing resource 100 may be configured as one or more pools or classes of generic data storage, network bandwidth, processing functionality, etc., or combinations thereof, without distinction on the part of resource users as to the specific hardware devices underlying the resources. That is, in some embodiments, resource users may interact with a computing resource 100 as though it were a virtual device of some particular type (e.g., a virtual disk device, processor or network device).

Instances of computing resource 100 need not be restricted to tangible or abstract types of hardware resources, however. In some embodiments, computing resource 100 may be configured to provide more complex, arbitrarily defined services to clients and customers. That is, instead of being configured to perform a generic storage, communication or processing function, in some embodiments computing resource 100 may be configured to provide more specialized functions to resource users. Such embodiments of computing resource 100 may be generically referred to as software resources. For example, in some embodiments computing resource 100 may include a database service that may evaluate queries submitted by users against a particular stored data set; a data transformation service that accepts a particular type of data as input, applies a transformation to the input, and returns the result; or other types of computing services that provide output or take actions according to an algorithm or program as a function of input data or commands. More specific examples of services that may be provided by various embodiments of computing resource 100 may include inventory catalog services (e.g., for determining retail inventory availability, pricing, etc.), transaction processing services (e.g., for processing orders, payments, etc.), data modeling services (e.g., predictive modeling of future product sales modeling, pricing, etc.), and other suitable types of services. In some embodiments, access to hardware and/or service types of computing resources 100 may be provided through a web services interface as described in greater detail below. Additionally, in some embodiments, computing resource 100 may be configured to function as an interface or "front end" to another resource that may not be a computing resource. For example, in one embodiment computing resource 100 may provide a scheduling or queuing interface for tasks to be performed, e.g., by a human agent.

In some embodiments, virtualization of tangible devices into an abstract hardware computing resource 100, or configuration of various other resources as a service computing resource 100, may be performed within resource 100 itself. For example, with respect to abstract hardware resources, in one embodiment a standalone disk array may include multiple physical disks as well as hardware and software configured to organize and present the physical disks as one or more virtualized devices or volumes to be presented as computing resources 100. Similarly, in one embodiment a computer system including multiple processors may be configured to manage processor scheduling internally and may present itself as a single virtual source of processing cycles (e.g., a virtual processor type of computing resource 100). With respect to service resources, in one embodiment a computer system may be configured with appropriate hardware and software to function as an application server, e.g., a server configured to perform specific types of functions upon request, which functions may be offered as services that may be performed upon the request of users. In some such embodiments, the particular services provided by the application server may be treated as computing resources 100.

In other embodiments, virtualization or abstraction of devices into abstract hardware resources or service resources may be controlled or managed by interfaces between resource users and the entities underlying the resources. For example, in one embodiment local resource interface 110 and/or web services interface 120 may be configured to perform virtualization functions with respect to underlying resources 100 on behalf of resource consumers.

It is noted that in some embodiments, computing resource 100 may encompass human as well as machine resources. For example, in some embodiments computing resource 100 may include human task performers, such as employees or contract workers who may receive work to perform via local resource interface 110 and/or web services interface 120. Such human task performers may, for example, be assigned to perform tasks that may be difficult to automate or implement via a software algorithm, such as image classification, complex customer service operations, or other suitable tasks.

In various embodiments, entities underlying abstracted or virtualized computing resources 100 may or may not themselves be visible as resources 100 to various resource users. In some embodiments, different resource users may view resources 100 at different levels of abstraction. For example, in one embodiment an application program may be configured to interact with storage through a file system resource 100 that organizes physical details of underlying storage devices transparently to the application, while a different program may be configured to bypass a file system and interact directly with underlying storage devices as resources 100.

In the illustrated embodiment, enterprise resource clients 130 are configured to access computing resource 100 via local resource interface 110 (also referred to as local interface 110, or simply interface 110). Interface 110 may generally encompass any suitable interface (or collection of interfaces) to resource 100, such as an application programming interface (API), a hardware device interface, a standard communication protocol interface (e.g., a TCP/IP port), a custom or proprietary interface, etc. Implementation details of interface 110 may vary in various embodiments depending on the types of enterprise resource clients 130 serviced by the interface as well as the resource 100 interfaced to. For example, in some embodiments clients 130 may include application programs executing on the same underlying computer system as a service resource 100, which applications may communicate with the resource 100 via an API call local to the computer system. In other embodiments, clients 130 may include applications or systems configured to interact with resources 100 via a network, in which case interface 110 may encompass, for example, networking protocols as well as API calls specific to the resource 100.

Interface 110 may serve as a relatively passive conduit for data and control information passing between clients 130 and resource 100, although as described above, in some embodiments, interface 110 may also manage various aspects of configuration, virtualization, etc. of a resource 100. More generally, in some embodiments the path of interaction between a given client 130 and resource 100 may involve the interaction of numerous different systems, devices, and layers of abstraction. In some such embodiments interface 110 may encompass all aspects of such a path.

In the illustrated embodiment, external resource customers 140 may access computing resource 100 via web services interface 120 (also referred to as WS interface 120, or simply interface 120). In some embodiments, WS interface 120 may be distinct from local interface 110, which may allow external customers access to resource 100 under different usage policies, interfacing conventions, etc. from those applied to enterprise clients 130. However, in some embodiments, both internal enterprise clients 130 and external resource customers 140 may access computing resource 100 through a web services interface similar to interface 120. A computing resource 100 that may be accessed via a web services interface may also be referred to as a web services resource 100. In such embodiments, access to certain resources 100 may be governed by similar web services interfacing conventions regardless of the nature of the resource user. However, in some such embodiments, user-specific policies may be used to differentiate types of resources a user may access, levels and frequency of permissible usage, or other types of resource controls based on the type of user (e.g., internal or external), the specific identity of the user, or other relevant factors.

Generally speaking, a web services interface such as interface 120 may encompass a variety of standardized APIs configured to allow different software programs to communicate (e.g., to request services and respond to such requests) in an autonomous, typically platform-independent manner. For example, an enterprise may choose to expose certain enterprise data (e.g., catalog data, inventory data, customer data or other types of data) and/or certain enterprise functions (e.g., query functions, electronic commerce functions, generic data storage or computational functions, etc.) to external customers (or, in some embodiments, internal clients) via a web services interface. Applications could then access the exposed data and/or functions via the web services interface, even though the accessing application may be configured to execute on an entirely different platform (e.g., a different operating system or system architecture) than the platform hosting the exposed data or functions.

In some embodiments, web services interface 120 may encompass the use of particular protocols to publish available web services to potential users, to describe the interfaces of web services sufficiently to allow users to invoke web services properly, to allow users to select and differentiate among web services for a particular transaction, and to provide a format for exchanging web services data in a flexible and platform-independent manner. Specifically, in one embodiment a provider of a web services resource 100 may register the service via interface 120 using a version of the Universal Discovery Description and Integration (UDDI) protocol, which may function as a general directory through which potential resource users may locate web services of interest. The web services provider may also publish specific details regarding how a well-formed web services request from a user should be formatted (e.g., what specific parameters are required or allowed, the data type or format to be used for a given parameter, etc.). For example, such interface details may be published (e.g., within a UDDI directory entry) using a version of the Web Services Description Language (WSDL).

In many embodiments, web services request and response data is exchanged through interface 120 through the use of messages or documents formatted as platform-independent structured data, such as a document formatted in compliance with a version of eXtensible Markup Language (XML). For example, in one embodiment a request to a web services resource 100 to provide current pricing information for a given inventory item may be embodied in an XML document including fields identifying the item of interest, the type of data requested (e.g., pricing data), and possibly other fields, in which each field is delimited by an XML tag describing the type of data the field represents. The response to such a request from web services resource 100 may include an XML document containing the requested data. In some embodiments, web services-related documents may be transmitted between applications making requests and targeted web services using a web-based data transfer protocol, such as a version of the Hypertext Transfer Protocol (HTTP), for example.

Different types of web services requests and responses may yield XML documents that bear little content in common, which may complicate the handling and interpretation of such documents. For example, in different versions of a free-form XML document specifying a web services request, the actual web services resource 100 that is requested may appear at different places within different document versions, which may require a recipient of the document to buffer or parse a good deal of document data before understanding what the document is for. Consequently, in some embodiments, the XML documents containing web services request/response data may encapsulated within additional XML data used to define a messaging framework, e.g., a generic format for exchanging documents or messages having arbitrary content. For example, in one embodiment web services requests or responses may be XML documents formatted according to a version of the Simple Object Access Protocol (SOAP), which in various versions may define distinct document sections such as an "envelope" (e.g., which may include a specification of the document type, the intended recipient web service, etc.) as well as a message body that may include arbitrary XML message data (e.g., the particular details of the web services request). However, in some embodiments, web services may be implemented using different protocols and standards for publishing services and formatting and exchanging messages.

Figure 2:
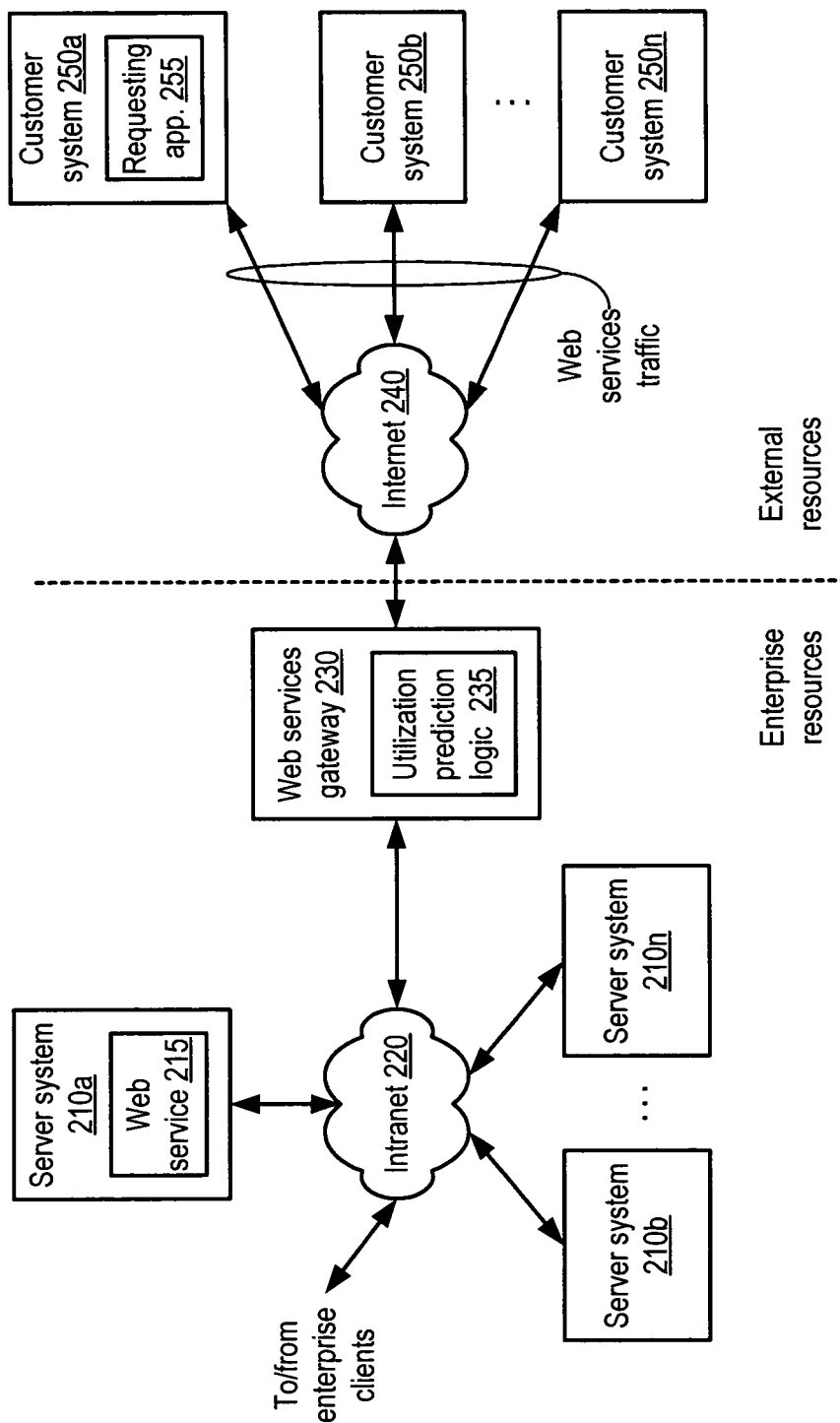
FIG. 2 is a block diagram illustrating another embodiment of an exemplary enterprise computing system.

A more detailed embodiment of an enterprise computing system illustrative of the system of FIG. 1 is shown in FIG. 2. In the illustrated embodiment, resources local to the enterprise include an arbitrary number of server systems 210a-n each coupled to an enterprise intranet 220. Server system 210a is configured to host a web service 215, although other systems 210 may also be configured to host web services. Enterprise clients (not shown in FIG. 2) are configured to access server systems 210 (and, in some embodiments, web service 215) via intranet 220.

Server systems 210 interface with resources external to the enterprise via web services gateway 230, which is in turn coupled to internet 240. An arbitrary number of customer systems 250a-n are coupled to internet 240 and configured to generate web services traffic, some of which may target web services hosted by enterprise server systems 210 such as web service 215. In particular, customer system 250a hosts a requesting application 255 that may be configured to generate web services requests and to receive responses, although other systems 250 may also be configured to host applications. It is noted that the system topology shown in FIG. 2 is only one example of a possible system configuration, and that numerous variations and extensions of such a system are possible and contemplated.

In various embodiments, server systems 210 may include any suitable systems that may be configured to host web services or other types of computing resources 100. For example, in one embodiment a given server system 210 may include a standalone or rack-mountable computer system including one or several processors (e.g., processors compatible with the x86, SPARC™, Power™/PowerPCT™, or other suitable instruction set architectures), system memory, networking and/or other peripheral support. Further, in various embodiments server systems 210 may be configured to execute a variety of operating systems (e.g., versions of Microsoft Windows™, Sun Solaris™, Linux, Unix, or other suitable operating systems) as well as applications configured for operation on a particular processor architecture and operating system. In some embodiments, server systems 210 may be referred to as application servers. Generally speaking, the number and specific configuration of server systems 210 may vary depending on the needs of an enterprise and its customers, and may range from a small number of high-performance systems (e.g., expensive, custom server systems) to a large number of generic systems (e.g., a cluster or grid of commodity systems), or any suitable combination thereof. Intranet 220 through which server systems 210 are interconnected may generally encompass any suitable type of networking technology, such as wired or wireless Ethernet, token-ring, optical fiber, or other types of local/wide-area/metropolitan-area networking technology (LAN/WAN/MAN).

Depending on the context in which computing resources are defined for resource users, either server systems 210, web services 215 or both may be illustrative of computing resource 100 of FIG. 1. For example, in some embodiments, server systems 210 may be made available to resource users as generic processing or storage computing resources 100, while in other embodiments, server systems 210 may implement web services 215 transparently to resource users, such that web services 215 may be the only computing resources 100 visible to resource users.

In some embodiments, enterprise-side resources may include other devices or entities not shown in FIG. 2. For example, in some embodiments the enterprise may include additional systems coupled to intranet 220 and configured to function as client systems to server systems 210, e.g., by submitting enterprise-internal requests for web services or other computing resources to server systems 210. Also, in some embodiments the enterprise may include storage devices distinct from server systems 210 that may be coupled to intranet 220, such as via network attached storage (NAS), storage area networks (SAN) or other suitable storage interfacing technologies.

Customer systems 250 may generally include any type of system capable of generating web services traffic such as web services requests. For example, in some embodiments customer systems 250 may be configured as server systems similar to server systems 210, such as when customer systems 250 are configured as enterprise servers within another enterprise (e.g., in embodiments in which the system of FIG. 2 is configured to process business-to-business transactions). In other embodiments, customer systems 250 may be standalone systems (e.g., desktop or laptop machines), handheld devices, cellular phones, thin client systems, or any other type of system capable of hosting a requesting application 255 and interacting with other systems via internet 240. In some embodiments, customer systems 250 may communicate with internet 240 indirectly, such as via internet service providers, internal gateway/proxy systems or other intermediate devices or entities. Generally speaking, requesting application 255 may include any type of application capable of generating web services requests and receiving responses. In some embodiments, application 255 may include a web browser or other type of HTTP-aware interface, although it is contemplated that any type of application (e.g., custom/proprietary applications, office applications, etc.) may be so configured. Customer systems 250 and/or applications 255 may generally be illustrative of external resource customers 140 as shown in FIG. 1.

In the illustrated embodiment, web services traffic may enter and exit the enterprise via web services gateway 230, which may in various embodiments include one or more routers, servers or other devices configurable to separate web services traffic from other types of internet traffic for processing. In some embodiments, web services gateway 230 may be configured to perform additional functions, such as routing specific web services requests to corresponding server systems 210 according to request type, load-balancing concerns, or other applicable routing factors. Segregating web services traffic from other types of traffic via web services gateway 230 may in some embodiments facilitate the application of different classes of policies to different types of computing resource utilization. For example, as described in greater detail below, different policies regarding resource utilization, resource pricing or other terms of service may be applied to external customers vs. resource users internal to an enterprise, or to web services utilization vs. utilization of other computing resources 100. However, in some embodiments, gateway 230 may be omitted. In such embodiments, the functionality of gateway 230 may be incorporated into one or more server systems 210 in addition to the other tasks performed by those systems. Alternatively, each server system 210 may be configured to directly receive web services and other types of traffic from internet 240 without such traffic being filtered or redirected by an intermediate device. When present, gateway 230 may be illustrative of a portion of the functionality provided by web services interface 120 of FIG. 1. However, in various implementations as described above, aspects of web services interface 120 may be distributed between client systems or applications configured to make web services requests (e.g., customer systems 250/applications 255) and host systems configured to implement services that evaluate and respond to such requests (e.g., server systems 210/web services 215).

In the illustrated embodiment, web services gateway is configured to host utilization prediction logic 235. In various embodiments, utilization prediction logic 235 may be software or hardware configured to implement any of the methods and techniques for predicting and pricing utilization of computing resources 100 (e.g., web services 215) described below in conjunction with the descriptions of FIGS. 4-7. In some embodiments, utilization prediction logic 235 may be configured to perform such methods and techniques on behalf of multiple resources 100 within an enterprise, while in other embodiments, individual instances of utilization prediction logic 235 may be implemented for each resource 100 of interest. For example, in some embodiments each of server systems 210 may host one or more instances of utilization prediction logic 235 corresponding to the web service(s) 210 hosted by the respective server 210.

Resource Utilization

Computing resources 100 are generally finite resources, and a given configuration of a particular computing resource 100 generally exhibits an upper limit on the degree to which that resource may be utilized by a user (which limit may also be referred to as resource capacity), although for many different types of resources 100, the upper limit may be readily altered by adjusting the configuration to add or remove resource capacity. For example, a storage or communication resource 100 may have a certain limit on the quantity of data that can be stored or transmitted over any given time. More sophisticated resources, such as, e.g., web services resources 100, may have more complex capacity limits that may be a function of the capacities of underlying resources. For example, utilization of web services resources 100 may be constrained by limits on available computing power (e.g., number of transactions or instructions per second executable by server systems 210), data storage (e.g., number of bytes of capacity available for storing data associated with the web services transaction) and/or communications bandwidth (e.g., number of bytes or transactions per second that may be transmitted to/from server systems 210).

Generally speaking, the total utilization of a given computing resource 100 may be measured and expressed in units appropriate to the resource type. For example, utilization of a storage resource may be measured in terms of a quantity of data stored (e.g., bytes, megabytes (MB), gigabytes (GB), etc.) per unit of time (e.g., second, day, month, etc.). Similarly, communication bandwidth utilization may be measured in terms of a quantity of data transmitted per unit of time (e.g., megabits per second). Processing resource utilization may be measured as an aggregate number of units of processing effort (e.g., central processing unit (CPU) cycles, transactions, etc.) utilized, or as a rate of processing effort utilization per unit of time (e.g., CPU cycles or transactions per second).

In some embodiments, measures of resource utilization may be normalized to account for variations in different resource implementations. For example, a CPU cycle may represent a different level of processing effort for two different processor implementations, such that one processor completes half as much processing work of a given task in a given cycle as another processor. Consequently, in some embodiments where different types of processing resources 100 are provided, utilization of such resources may be expressed as normalized processing effort equivalents. For more complex or abstract computing resources 100, such as a web services resource 100 as described above, resource utilization may be measured in more abstract units, such as number of operations or transactions requested or completed per unit of time (e.g., number of web services requests per second). As different types of web services requests may require different amounts of effort to process (similar to processing resource utilization described above), in some embodiments web services resource utilization may be expressed in terms normalized to required processing effort of various requests as opposed to the raw number of requests made.

In various embodiments, it is noted that resource utilization may be expressed either in absolute terms, as just described, or as a fraction of a total resource capacity. For example, for a communication resource 100 configured for a total capacity of 100 megabits/second, its utilization at a particular point in time may be expressed as, e.g., 75 megabits/second or 75% of total capacity.

A particular computing resource 100 may be provisioned according to a given level or a given expected level of resource utilization of the particular resource 100. In some embodiments, the given level of resource utilization may correspond to some function of a capacity of resource 100. For example, in some embodiments the capacity of a given resource 100 (e.g., a server resource) may be fixed or not readily expandable, such that the utilization of given resource 100 is effectively limited or constrained by its capacity. In some such embodiments, the given level of resource utilization for which the particular resource 100 is provisioned may correspond approximately to the total capacity of the particular resource 100. That is, the given level of resource utilization may correspond to a maximum utilization of the particular resource 100, as determined by its total capacity. In other embodiments, additional resource capacity over and above the capacity needed to support the given utilization may be provided, e.g., as buffer or reserve capacity in case of unexpected increases in resource demand. For example, if a maximum expected daily utilization of a storage resource 100 is 100 GB, in some embodiments the storage resource 100 may be provisioned to store a total of, say, 120 GB, thus providing 20 GB of capacity in excess of the maximum expected utilization. In such an embodiment, the given level of resource utilization may correspond to a function of the maximum utilization of the resource 100, such as 83% of the maximum, capacity-constrained utilization.

In other embodiments, a given resource 100 may be provisioned according to a given level of utilization based on factors other than capacity of given resource 100. For example, provisioning a given resource 100 may include arranging for a third party to provide the given resource 100 under specific terms of service. Generally speaking, terms of service may characterize the conditions and obligations under which the third party is to provide the given resource 100, and the costs, constraints or obligations incurred by the customer in utilizing the given resource 100. Terms of service may generally include cost, measurement and payment models, rate structures, quality of service guarantees, or any other aspect of the relationship between the resource provider and the customer. In such an embodiment, the terms of service may prescribe that a customer incur a cost for the given level of resource utilization irrespective of the underlying capacity of the given resource 100. For example, a customer may be charged for actual utilization of a resource such as the bandwidth of traffic over a network communication resource 100. In such embodiments, resource utilization may not be effectively constrained by resource capacity, but rather by the terms of service under which the resource is provisioned. For example, an arbitrary degree of additional utilization in excess of the given, provisioned level may be possible, but at an additional cost, such as a monetary cost, decreased quality of service, increased latency, or other suitable cost factors.

In some embodiments, the total cost to an enterprise of provisioning a given computing resource 100 may depend directly or indirectly upon the given utilization of the given resource 100. That is, the total implemented resource capacity (e.g., quantity of storage, number of servers, number of employees or task performers, web services processing capacity, etc.) may be that which is sufficient to accommodate the given utilization, either alone or with a margin for reserve capacity. Further, in such embodiments, the total implemented resource capacity may determine resource cost.

In other embodiments, the total cost of provisioning a computing resource 100 may depend upon historical utilization of the resource 100. That is, instead of paying for a fixed amount of capacity of a particular computing resource 100, an enterprise may provision the particular resource 100 according to a particular capacity and then pay for the particular resource 100 according to actual usage of the resource capacity. For example, an enterprise may provision a communication link (e.g., a high-bandwidth digital communication channel, such as an OC-48 or OC-192 link, a T1 or T3 link, etc.) having a certain total capacity. The enterprise may then pay a third party for actual usage of the communication link, e.g., according to the maximum level of actual utilization of the link (or a certain fraction or other function of the maximum level) over a given period of time. For example, in one embodiment the cost of the link during a 24-hour period may be determined according to 95% of the maximum link utilization (e.g., as measured during intervals of seconds, minutes, hours, etc.) during that 24-hour period. Numerous other utilization-based cost models of computing resource 100 are possible and contemplated.

Figure 3:
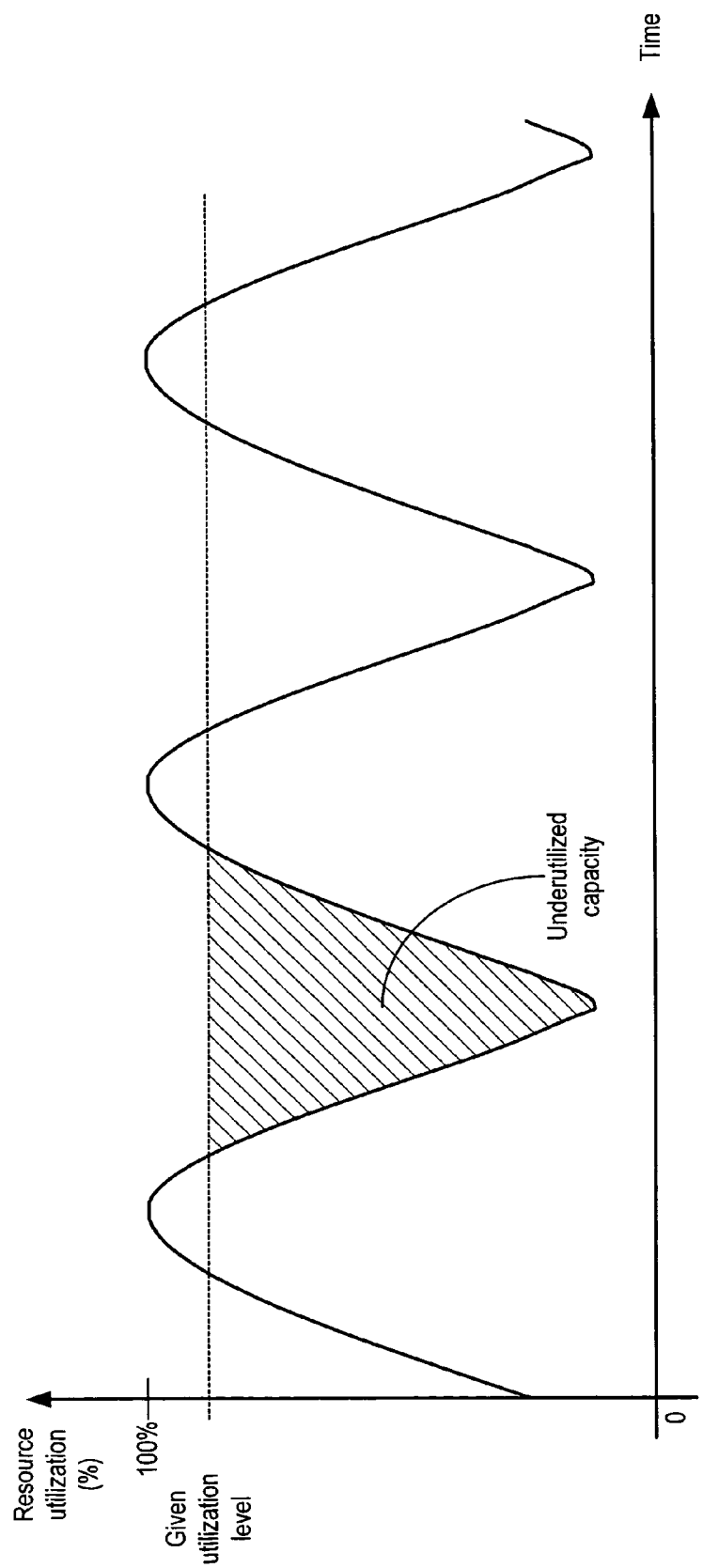
FIG. 3 is a graph illustrating exemplary utilization of a computing resource over time.

Regardless of whether costs of provisioning a computing resource 100 are determined according to total capacity or peak actual utilization of total capacity, in some instances, computing resource 100 may be underutilized at various points in time. That is, computing resource 100 may be utilized at a level that is less than the given utilization level that determines resource cost. One example of this situation is illustrated in the graph of FIG. 3. In the illustrated example, a computing resource 100 may be provisioned according to a given level of expected or actual utilization as described above. The given expected or actual utilization may be less than the total capacity of resource 100 as shown, although in some embodiments this may not be the case.

As shown in FIG. 3, utilization of a computing resource 100 varies widely over time. In embodiments where resource cost depends on a given expected or actual resource utilization, as described above, that cost may be incurred even during times when utilization falls below the given level. Consequently, when actual utilization falls below the given utilization, excess or underutilized resource capacity exists that may be devoted to performing additional work without impacting resource cost. That is, under such conditions actual utilization may be increased to the given level without incurring incremental resource costs. However, by the time actual utilization of a computing resource 100 is definitively determined, the utilization has typically already occurred, and thus the opportunity to increase utilization to take advantage of underutilized capacity may have passed. One exemplary period of resource underutilization is illustrated by the shaded area shown in FIG. 3. However, numerous different patterns of resource utilization and underutilization are possible and contemplated. For example, such patterns need not be cyclical or symmetrical.

Resource Incentives and Pricing

Figure 4:
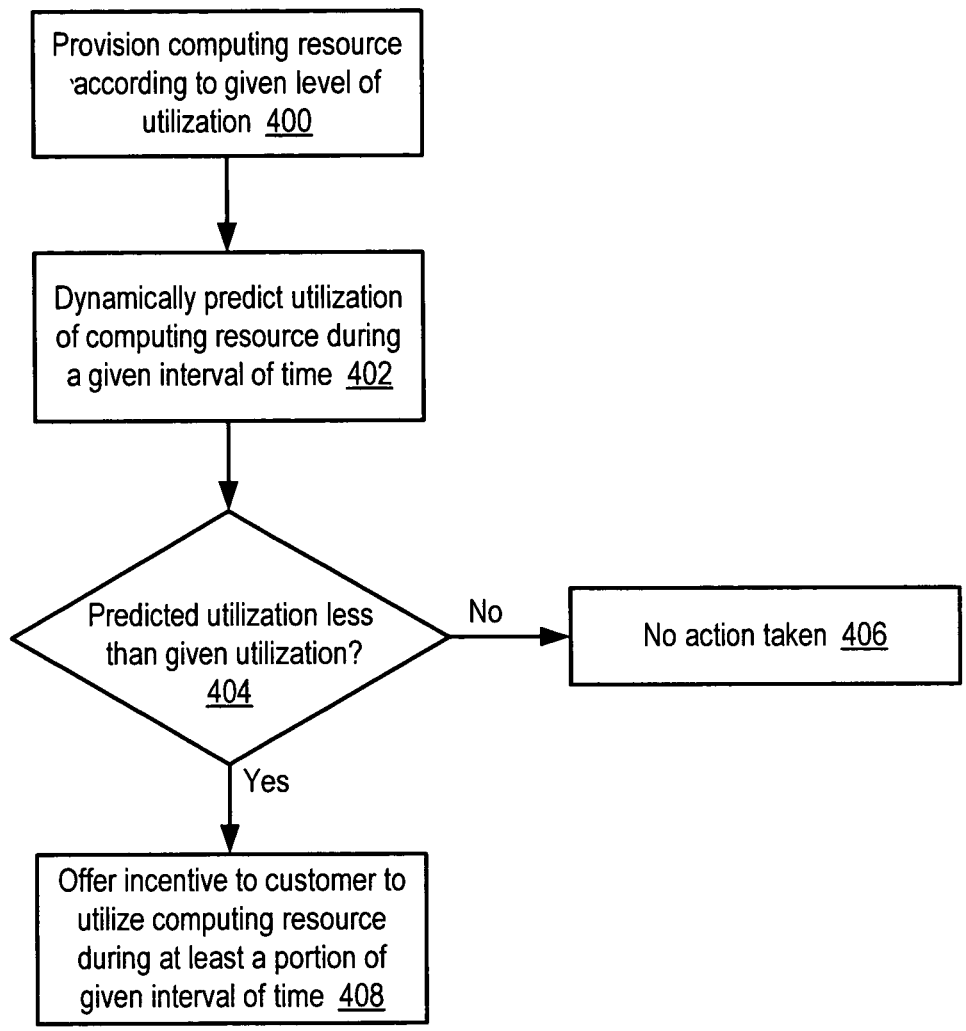
FIG. 4 is a flow diagram illustrating one embodiment of a method of offering incentives to customers to utilize a computing resource during times when the resource is predicted to be underutilized.

As described above with respect to FIGS. 1 & 2, in some embodiments an enterprise may provision resources 100 for utilization both by internal resource clients 130 and external customers 140. In one embodiment of a method as illustrated in FIG. 4, the enterprise may offer incentives to customers to utilize a computing resource 100 during times when the resource is predicted to be underutilized. In some embodiments, the method of FIG. 4 or a suitable variation may be implemented as program instructions stored by a computer accessible-medium and executable, for example by computing resource 100 itself, one or more of server systems 210, web services gateway 230, a dedicated resource management computer system (not shown), or another suitable device, as described in greater detail below in conjunction with the description of FIG. 8. Referring collectively to FIGS. 1-4, operation begins in block 400 where computing resource 100 is provisioned according to a given level of resource utilization. For example, as described above, in one embodiment a certain amount of resource capacity such as storage, processing, web services request or other resource capacity may be provisioned, and the cost of such provisioning may be determined according to the provisioned capacity. Alternatively, in some embodiments the cost of resource provisioning may be determined according to actual resource utilization, as in the bandwidth-utilization example described previously.

The utilization of the provisioned computing resource 100 during a given interval of time is then dynamically predicted (block 402). As suggested above, the likelihood of increasing utilization of underutilized resource capacity during a particular interval of time may be enhanced to the extent that underutilization is detected in advance of the particular interval, which may enable additional work to be scheduled during that interval as described below. Such detection in advance may entail making a prediction, which may be performed by, e.g., a predictive model configured to receive inputs and to predict a variable dependent upon those inputs.

In some instances, resource utilization during a given interval of time may be predicted according to static, invariant inputs, such as the type of the resource 100 being predicted, the identity of the interval, etc. For example, in one embodiment, utilization of a communication resource 100 may be statically predicted according to the interval of interest (e.g., may be statically predicted to be 15% during the hour 1:00-1:59 a.m., 67% during the hour 10:00-10:59 a.m., etc.). By contrast, a dynamic predictive model of resource utilization may take into account similar static variables as a static prediction, but may also depend on actual historical behavior of some inputs to the prediction. For example, in one embodiment a dynamic prediction of utilization of a communication resource 100 during the interval of 10:00-10:59 a.m. may include a static baseline prediction (e.g., 67%) that may be adjusted up or down depending on historical utilization of the communication resource 100 during the preceding hour or several hours, the same hour on a preceding day, or other historical data of interest. In other embodiments, a prediction may be determined entirely dynamically, e.g., as a function of a previous prediction or historical observation without beginning from a static baseline assumption. It is contemplated that in some embodiments, dynamic predictions of resource utilization for different intervals of time may differ, perhaps substantially, depending on the current and historical state of variables relevant to the different intervals at the time the predictions occur.

While a dynamic prediction of utilization may take into account historical behavior of certain variables, in one embodiment a dynamic prediction of utilization may take into account primarily the current state of such variables. For example, according to one such dynamic prediction, future utilization during a time interval of interest may be predicted to be some function of current utilization (e.g., the same as current utilization) measured at the time the prediction is made. In some embodiments, such a dynamic prediction may be updated in real time or near-real time as data on current utilization changes. Thus, in some embodiments, the offering of an incentive to utilize the resource, as described below, may be based on some measure of current utilization. More particularly, in some embodiments, the prediction may be simply that the current utilization is likely to continue for some given period of time into the future. The period of time may be selected so as to be sufficiently brief that the prediction is reasonably likely to remain valid throughout the duration of the selected period. The incentive, for example a reduction in price, may likewise be selected to be such that the utilization that results in response to the incentive is expected to not exceed the utilization thus predicted.

It is noted that in some embodiments, dynamic predictive models may incorporate historical behavior of variables other than the variable (e.g., utilization) being predicted. For example, utilization of a resource 100 may be correlated with pricing of the resource 100, such that a dynamic utilization prediction may take historical resource pricing information into account. Depending on the complexity of the predictive model employed, a number of variables seemingly tangential to the variable being predicted may be reflected in the dynamic prediction model. For example, a sale or marketing promotion relating to items being sold by an enterprise may correlate with increased utilization of a communication resource 100 (e.g., as increased numbers of customers visit a web site to make purchases). By extension, variables taken into account in dynamically predicting resource utilization need not be purely historical, but may also reflect future predictions or plans regarding other variables. For example, previously scheduled work, resource maintenance, planned business activities (e.g., promotions, liquidations, acquisitions, product line/manufacturing adjustments, etc.) or other suitable prospective variables, or combinations thereof, may be accounted for by various embodiments of a dynamic predictive model.

Thus, in various embodiments, dynamically predicting utilization of a computing resource 100 may include examining historical behavior of that computing resource 100 and/or other relevant historical variables. In other embodiments, dynamically predicting utilization of a computing resource 100 may include examining other predictions or future plans regarding relevant variables in addition to or instead of historical data. It is noted that although in some embodiments, the output of a dynamic prediction of utilization may include a concrete metric regarding predicted utilization, such as, e.g., an absolute quantity or percentage of utilization, in other embodiments this need not be the case. Rather, in some embodiments, the output of a dynamic prediction of utilization may include a range of values, a confidence interval, utilization trend information relative to the time of the prediction (e.g., a general indication that utilization is expected to increase/decrease), or other representations of possible future states of utilization.

It is further noted that in some embodiments, a prediction regarding any variable that contributes to utilization may be regarded as a prediction of utilization. For example, in one embodiment, historical sales data may bear a sufficient relationship to utilization of a computational resource 100 that a prediction regarding such sales data (appropriately scaled or transformed) may function as an acceptable proxy for predicted utilization. In such an embodiment, prediction of sales data may constitute a prediction of utilization. Also, in such embodiments, it is noted that dynamic prediction of utilization may be implicit in the dynamic prediction of other variables. That is, in some embodiments, some action (such as offering an incentive, as described below) may be taken on the basis of dynamically predicting variables indicative of utilization without directly computing a value, range or other indication of utilization. For example, in an embodiment where utilization U may be dynamically predicted as a function of a set of variables $U=f(A, B, C \ldots)$, and where some action A may be taken as a function of dynamically predicted utilization $A=g(U)$, then it may be possible to directly determine action A directly from the input variables $A=h(A,B,C \ldots))$. In such an embodiment, a dynamic prediction of utilization may not be directly produced as a discrete result, but may be implicit in the process leading to the determination of action A.

It is noted that the time interval for which dynamic prediction of resource utilization may be performed may vary in scope in various embodiments. For example, in one embodiment, utilization may be predicted for intervals of seconds or minutes in duration, while in another embodiment, predicted intervals may be measured in hours, days or another suitable duration. Additionally, the difference between the time utilization is predicted for a given interval and the time the given interval actually begins may vary in various embodiments. For example, in one embodiment a dynamic predictive model may be configured to predict resource utilization for an interval beginning at the current time, while in other embodiments prediction may occur for intervals that begin minutes, hours, days, etc. into the future. In some embodiments, dynamically predicting resource utilization for relatively short intervals relatively close to the present time may enable a finer degree of control over how additional work may be scheduled to use capacity that is predicted to be underutilized.

After utilization of the provisioned computing resource 100 is dynamically predicted for a given interval of time, it is determined whether the predicted utilization will be less than the given level of utilization for which the resource was provisioned (as that given level may be determined, e.g., by total capacity, maximum expected utilization with provision for reserve capacity, maximum historical utilization (such as a previous 24-hour peak utilization), etc.) (block 404). If the predicted utilization is not less than the given level of utilization (or, in some embodiments, if the difference between predicted and given utilization does not exceed a certain threshold value), no further action is taken (block 406).

If the predicted utilization is less than the given level of utilization (by at least the threshold value, if a threshold value is implemented), an incentive is offered to a customer, such as external customers 140, to utilize provisioned computing resource 100 during at least a portion of the given interval of time corresponding to the prediction (block 408). Many different models of offering an incentive to a customer to utilize potentially underutilized resources are possible and contemplated, and several such models are described below in conjunction with the descriptions of FIGS. 5 & 6. However, it is noted that a customer's utilization of a resource 100 that is predicted to be otherwise underutilized during a given interval of time may result in little to no incremental cost to the enterprise, as the resource cost may be determined by the given level of utilization for which the resource was provisioned.

In one embodiment, the incentive offered to a customer to utilize a computing resource 100 may be a direct financial incentive related to a cost normally charged for the use of computing resource 100. For example, in one embodiment, offering an incentive for resource utilization that is desired to occur during a given interval of time may include offering a discount (e.g., a percentage or fixed reduction) on the rate ordinarily charged for utilization during the given interval. Thus, for example, web services requests may ordinarily be charged a flat rate 0.5 cents per request, and an incentive to utilize a web services resource 100 may include applying a 50% discount to the usual flat rate during the incentive interval, resulting in a rate of 0.25 cents per request. It is noted that any mention herein of specific prices, costs, rates, capacities, measures of utilization, discounts, etc. is strictly exemplary, and that any suitable quantities may be used in place of those mentioned, without limitation.

However, in some embodiments, offering incentives may involve other methods of increasing the scope or volume of a resource 100 available to a customer beyond simple rate discounting, depending upon the method for which a customer is charged for utilization of resource 100 (the "pricing model"). For example, according to one resource pricing model, a customer may be allowed a specific level of access to a given resource 100 for a given cost (e.g., 1 web services request per second, 100 kilobits/second of network bandwidth, 2 GB of storage per day, etc.). Offering a utilization incentive within such a pricing model may include increasing the level of resource access while keeping the cost the same (e.g., allowing an arbitrary or even unlimited number of web services requests per second, etc.). Similarly, according to one pricing model, a customer may be allowed fixed or unlimited access to a certain subset of resources 100 for a given cost, but no access to other resources 100. Offering an incentive in this scenario may include expanding the scope of resources 100 available to the customer. For example, in one embodiment both delayed and real-time financial data may be available through a web services resource 100 for different costs. For a customer who subscribes to delayed data, a utilization incentive may include an offer of access to real-time data for little or no additional cost during the interval of interest.

It is noted that in some embodiments, incentives related to level and scope of access to resources 100 may be applicable even for resources 100 for which no cost is charged to a customer. For example, an enterprise may allow a certain level or scope of resource access to customers without charge as a promotional or marketing strategy, as a goodwill gesture, etc. In one such embodiment, offering incentives may variously expand the ways in which customers may access and use such resources 100 during the incentive interval, even if such utilization remains without charge.

Numerous other types of incentive structures are possible and contemplated. For example, in various embodiments, offering an incentive to a customer may include offering a rebate to be paid to the customer at a later date, offering a credit against future usage, offering credit, goods or services sourced from a third party (e.g., a promotional partner), bundling of goods or services ordinarily offered separately, or any other suitable model of incentive. Additionally, in some embodiments, incentives may be offered under various customer terms or conditions, such as prepayment for utilization, volume or quantity requirements on the amount of utilization to be used, etc.

For example, in one embodiment a discount incentive may be offered to a customer to promote utilization of a computing resource 100 under the condition that the customer agrees to purchase a certain amount of resource utilization during the time interval of interest, irrespective of whether the customer actually utilizes the purchased utilization. For instance, if requests to a web services resource 100 are ordinarily priced at a rate of 0.5 cents per request, a customer may be offered the opportunity to perform up to 100 web services requests during a particular ten-minute interval of predicted web services underutilization for a cost of 20 cents. If the customer actually performs the full number of requests allowed under the incentive, the customer may realize a discount of 60% relative to the ordinary rate. In some such incentive structures, circumstances may exist in which the customer may pay more for resource utilization than if the customer had not agreed to the terms of the incentive. Referring to the example just described, if the customer makes fewer than 40 web services requests during the specified ten-minute interval, the effective cost per request may be greater than the ordinary 0.5 cent rate. Thus, utilization incentives offered to customers may in some embodiments involve risk on the part of the customer, such as the risk of failing to financially break even (relative to the costs of declining the incentive) if incentive conditions are not met.

Incentives need not be structured as discounts, credits or other monetary terms. For example, in some embodiments, an enterprise might offer a number of levels of quality of service to which a customer may subscribe, under a corresponding fee or rate structure, according to specific terms of service. In such embodiments, an incentive may offer such a customer access to an improved level or quality of service for the same rate structure. For example, a subscriber to a "silver" level of service that is associated with one set of service parameters (e.g., bandwidth, transaction speed, transaction volume, support level, or any other appropriate parameters) may be temporarily offered, as an incentive, access to a "gold" level of service associated with an improved set of service parameters.

As described above, in one embodiment the offering of an incentive to utilize a particular resource 100 is dependent upon predicted underutilization of that resource during a particular time interval. In some instances, a customer that accepts the incentive offer and begins utilizing the resource 100 during the particular time interval may not complete utilizing the resource 100 by the end of the particular time interval, or the end of a time boundary specific to the incentive offer. For example, the customer may purchase a certain quantity (e.g., 10 seconds) of processing time of a web services resource 100, to be used during a specified time interval, but a particular web services request submitted by the customer may overrun the allotted quantity of processing time or the end of the incentive time interval. In various embodiments, such incentive boundary conditions may be handled in a variety of ways. For example, in one embodiment a customer's utilization of a resource 100 may simply be terminated when an incentive time interval expires, when a customer has exceeded the terms of the incentive, etc. In another embodiment, a customer may be allowed to continue utilizing resource 100, but under modified terms. For example, the customer may immediately be charged a maximum rate for any resource utilization that extends beyond the terms or time interval of the incentive. Alternatively, the customer may be charged a rate that progressively increases over time, culminating in a maximum rate.

It is noted that in some instances, a customer's continued utilization of a resource 100 beyond the time horizon of the prediction that initially led to the incentive offer may result in undesirable resource utilization patterns. For example, a resource 100 may be predicted to be underutilized during two adjacent time intervals, A and B. Correspondingly, incentives may be offered to and accepted by two different customers to respectively increase resource utilization during intervals A and B. However, if the first customer's utilization overruns the end of interval A, and the second customer's utilization begins at the beginning of interval B, the resource 100 may become overutilized, which may degrade resource performance or result in service failure. Consequently, in some embodiments strict policies regarding the boundaries of incentive intervals and related terms and conditions (e.g., the termination or cost escalation policies described above) may be employed to provide a disincentive to customers from exceeding those boundaries.

Figure 5:
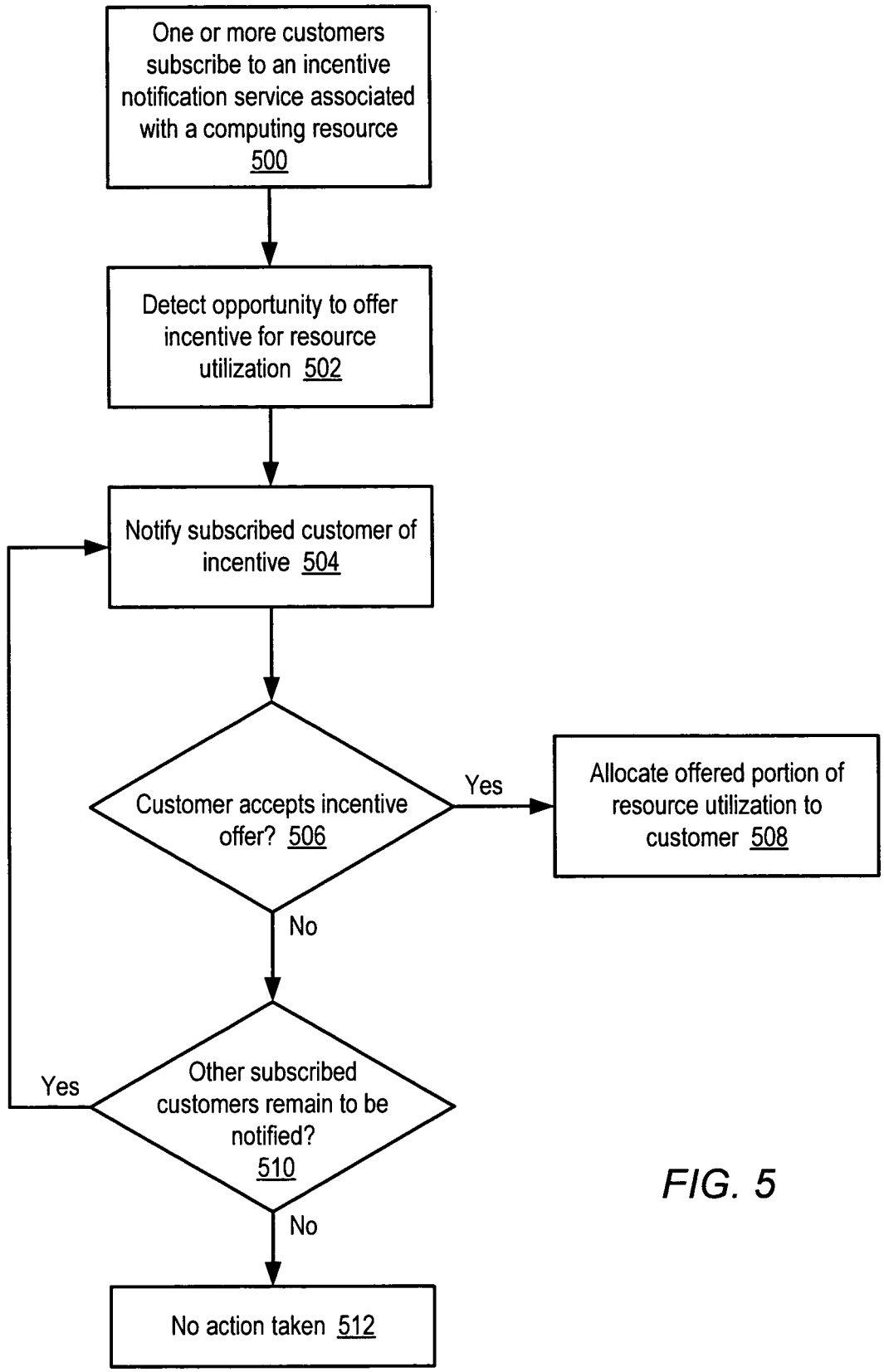
FIG. 5 is a flow diagram illustrating one embodiment of a particular method of offering an incentive to a customer to utilize a computing resource during a given interval of time.

One embodiment of a particular method of offering an incentive to a customer to utilize a computing resource 100 during a given interval of time is illustrated in FIG. 5. Referring collectively to FIGS. 1-5, operation begins in block 500 in which one or more customers (e.g., via requesting applications 255) subscribe to an incentive notification service associated with a computing resource 100. For example, in subscribing to such a notification service, a customer may indicate a desire to receive notification of any incentives offered with respect to computing resource 100, or only those incentives meeting certain criteria specified by the customer. In various embodiments, an incentive notification service may be implemented by computing resource 100 itself, by an interface to the resource such as web services interface 120, or by another system or entity within an enterprise (e.g., one or more of server systems 210 or web services gateway 230). In some embodiments, the notification service may be implemented alongside the implementation of the resource utilization prediction method of FIG. 4. An incentive notification service may be implemented as a web service in some embodiments, while in other embodiments a custom or proprietary messaging API may be used to implement the notification service.

Subsequently, an opportunity to offer an incentive for resource utilization is detected (block 502). For example, as described above with respect to FIG. 4, predicted utilization of computing resource 100 may be less than a given level of utilization during a particular interval of time.

In response to detecting the incentive opportunity, one of the customers subscribed to the incentive notification service is notified of the incentive (block 504). For example, a web services message or another type of message may be generated and conveyed to a particular customer system 250 indicating the details of the incentive. In some embodiments, if a customer has specified certain notification criteria, the customer may only be notified if the generated incentive satisfies those criteria.

The notified customer then either accepts or declines the offered incentive (block 506). If the customer accepts, the offered portion of resource utilization is allocated to the customer, and the method completes (block 508). If the customer declines, and other subscribed customers remain to be notified, the remaining customers are notified in turn (blocks 510, 504). In some embodiments, multiple incentive offers may be made concurrently, and thus notification of remaining customers may not be dependent upon a previously notified customer declining the offer. If no subscribed customer accepts the offered incentive, the method may complete without taking further action (block 512). In some embodiments, other methods of offering incentives to customers may be employed if no subscribed customer accepts the offered incentive, or before any offer to a subscribed customer is made.

In some embodiments, once an opportunity to offer an incentive for resource utilization is detected (e.g., in response to predicting resource underutilization), the types of incentives offered and the particular customers to which incentives are offered may be chosen to optimize other business goals. That is, while a primary business goal may be to increase utilization under certain circumstances through incentives, a secondary business goal may be to increase utilization subject to optimizing some other constraint(s). For example, if a certain degree of excess resource capacity is predicted, an enterprise may seek to minimize the overhead in managing the utilization of the excess capacity by attempting to find a single customer willing to utilize the entirety of the excess during the time interval of interest. That is, it may be more efficient for the enterprise to deal with offering incentives to a small number of customers rather than a large number.

However, in some instances, committing a quantity of resource capacity to a single customer under an incentive may be disadvantageous. For example, if a single customer commits to utilizing excess capacity during an incentive interval, but continues utilizing the resource after the interval ends, there may be insufficient resource capacity to meet demand following the interval when demand may rise. Thus, if there is a risk of resource oversubscription due to one or a small number of customers monopolizing a resource, an enterprise may choose to offer incentives to a larger number of customers, to hold a certain amount of excess capacity in reserve for contingencies, or to implement a pricing model that discourages oversubscription. In general, the enterprise may take other suitable actions to optimize or satisfy constraints on how utilization improvement may be accomplished through incentives.

Additionally, once an opportunity to offer an incentive for resource utilization is detected, it is contemplated that in some embodiments, the specific incentive offered may depend upon the customer to whom the incentive is offered. For example, customers who subscribe to a higher level of quality of service, customers who conduct large volumes of business, longstanding customers, or other categories of customers may be offered incentives that may be more preferential than incentives offered to other classes of customers. In some embodiments, if fewer than all customers within an eligible class or group are offered an incentive, the customers to be offered the incentive may be selected according to a suitable selection algorithm. For example, selection may occur randomly, on the basis of recent customer activity, in a round-robin fashion, or according to another algorithm. If an incentive offer is rejected by a customer, another customer may be selected to receive the same incentive offer, or a different offer may be made to another customer. In some embodiments, an incentive offer may include an indication of an expiration date or time, or may expire after a default or implicit amount of time passes. An expired incentive offer may be deemed to have been rejected by a customer.

In the embodiment described above, an incentive is offered to each of several subscribed customers in turn. However, in some embodiments, such an offer may be made by broadcasting a notification to all subscribed customers, or even all customers regardless of their subscription status, and allocating the resource 100 to the first customer(s) to respond with acceptance of the offer. In some embodiments, the number of customers to which an incentive offer is broadcast may be dependent upon a prediction of the degree to which the offers will be accepted.

Figure 6:
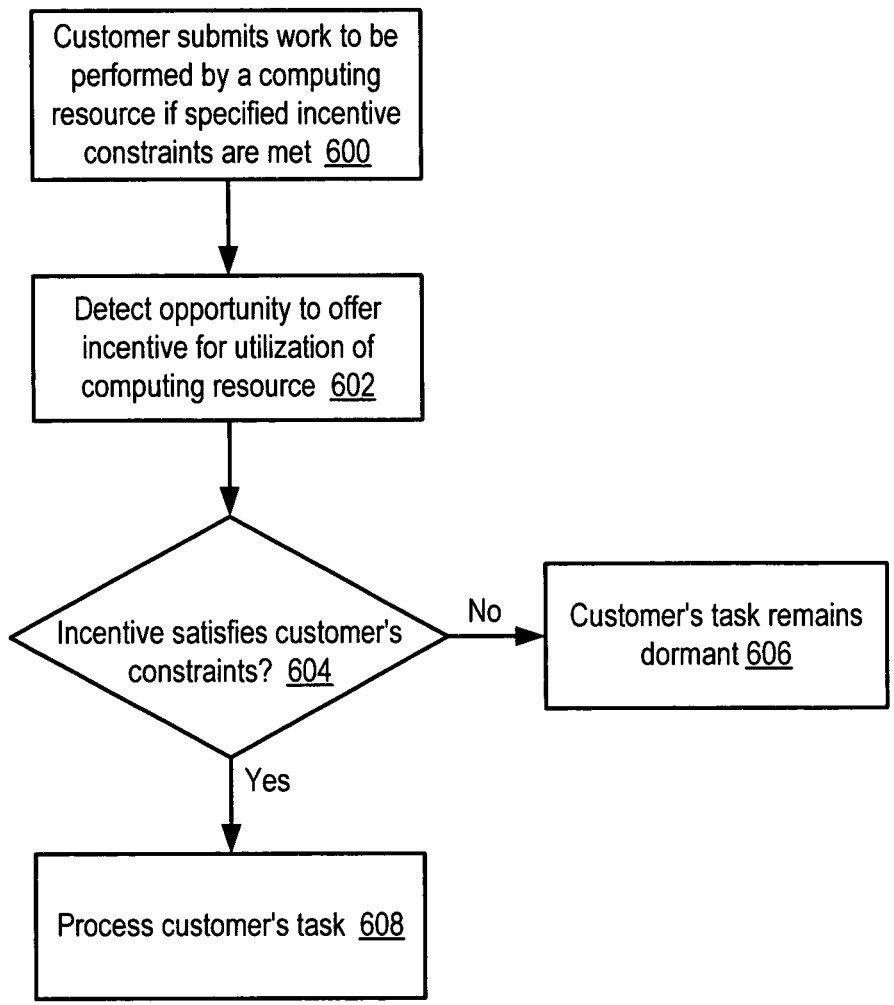
FIG. 6 is a flow diagram illustrating one embodiment of a method in which the offering of an incentive to utilize a computing resource may be implicit in an arrangement made with a customer in advance of such utilization.

In some embodiments, the offering of an incentive to utilize a computing resource 100 may be implicit in an arrangement made with a customer in advance, rather than dependent upon explicit notification and acceptance of the offer as shown in FIG. 5. An exemplary embodiment of a method of such implicit incentives is illustrated in FIG. 6. Referring collectively to FIGS. 1-6, operation begins in block 600 where a customer submits a task, job, request or other type of work to be performed by a computing resource if specified incentive conditions, rules or constraints are met. For example, in one embodiment a customer (e.g., via a requesting application 255) may convey a request to a web services resource 100 to perform a particular task. The request may include incentive constraints, e.g., specifying that the request should only be processed during times when web services processing rates are beneath a threshold value, or another suitable expression of a constraint. In one embodiment, when work is initially submitted, it is not immediately processed, but rather kept dormant until incentive constraints may be evaluated as described below.

An opportunity to offer an incentive for utilization of the computing resource 100 is then detected (block 602). For example, as described above with respect to FIGS. 4 & 5, predicted utilization of computing resource 100 may be less than a given level of utilization during a particular interval of time.

In response to detecting the incentive opportunity, it is determined whether the incentive satisfies the constraints previously specified by the customer (block 604). If not, the customer's requested task is kept dormant (block 606). If so, the customer's requested task is processed (block 608). In some embodiments, processing may continue for a specified period of time (e.g., the interval for which resource 100 was predicted to be underutilized) or as long as the incentive constraints continue to be satisfied. Also, in some embodiments, multiple customers may submit requests with respective incentive constraints. In such embodiments, each such customer's request may be evaluated serially or concurrently when an incentive opportunity is detected to determine whether the incentive satisfies the constraints of a particular customer.

In some embodiments, a customer may specify more complex constraints for determining when work should be performed. For example, a customer may specify an incentive threshold for a given job, as described above, as well as a deadline before which the job must be started or completed at any cost. In such an example, if the incentive threshold conditions are satisfied prior to the deadline, the job may be performed according to the incentive. Otherwise, the job may be performed according to the deadline constraint. Other combinations of constraints are possible and contemplated. For example, a customer may specify one set of incentive constraints that apply during one time period, and another during a second time period.

In some embodiments, rather than offering incentives for utilization of a computing resource 100 specifically in response to predicting underutilization of the resource 100, incentives may be incorporated within a general, dynamic pricing model for the resource 100. Rather than assuming default pricing conditions and modeling incentives as deviations from those conditions, in one embodiment such a dynamic model may more or less continuously predict utilization of resource 100 and set or adjust pricing according to the prediction. Customers may then opportunistically determine whether or not to utilize resource 100 according to whether the current price of the resource during the time interval of interest meets their requirements.

Figure 7:
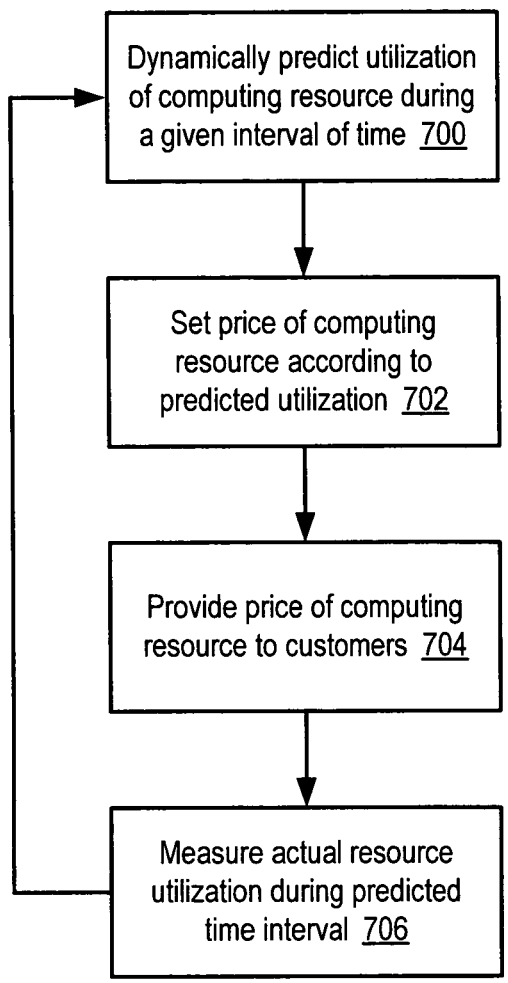
FIG. 7 is a flow diagram illustrating one embodiment of a method of dynamic resource pricing.

One embodiment of such a method of dynamic resource pricing is illustrated in FIG. 7. Referring collectively to FIGS. 1-3 & 7, operation begins in block 700 where expected utilization of a computing resource 100 is dynamically predicted for a given future interval of time. In some embodiments, dynamic prediction of resource utilization may be similar to that described above in conjunction with the description of FIG. 4. In one particular embodiment, dynamic resource utilization prediction may take into account feedback from the status of previous predictions, such as the comparison of a previous prediction against actual utilization for a given interval.

The price of computing resource 100 is then set or adjusted according to the predicted utilization (block 702). For example, if utilization is predicted to increase for a given future time interval, the corresponding price for utilization during the given future time interval may be raised. Correspondingly, if future utilization is predicted to decrease, the corresponding price may be decreased. In some embodiments, setting a resource price dependent upon a predicted utilization may include adjusting (e.g. incrementally) the price as a function of a previous price, while in other embodiments a resource price may be set arbitrarily dependent upon predicted utilization.

The price of computing resource 100 is then provided to customers (block 704). For example, the resource price for a given future interval of time may be made available to customers through a web service, e.g., as a request for quote. Actual resource utilization during the predicted time interval is then measured (block 706) and fed back into the predictive step (block 700). In various embodiments, the length of the time intervals for which utilization is predicted, the distance into the future for which predictions are made, and the increment (if any) by which resource pricing is adjusted may all be dynamically variable parameters of the pricing algorithm. Additionally, in some embodiments the dynamic pricing algorithm may be combined with and reflect the effects of various specific incentive offers, such as those described above and shown in FIGS. 4-6.

Although the embodiment of FIG. 7 is described in terms of price of computing resource 100, in various embodiments any parameter associated with offering utilization of computing resource 100 may be set or adjusted in a similar fashion. For example, offer parameters that may be set dependent upon dynamically predicted utilization may include the amount or degree of utilization permitted according to the offer, a quality of service associated with the offer, a duration for which the offer may be valid, or a granularity with which units of utilization may be measured, as well as other desired parameters.

It is noted that in some embodiments, the methods and techniques described above may allow an enterprise to provision computing resources 100 for its own internal requirements (e.g., the computing needs of enterprise resource clients 130) and to effectively make use of computing resources 100 during times when those resources are underutilized by offering utilization incentives to external customers. That is, in such embodiments, the utilization prediction and incentive algorithms may be configured to give priority to internal resource clients 130. However, in some embodiments, internal resource clients 130 may compete evenly with external resource customers 140 for utilization of resources 100 in a dynamic open market. It is further contemplated that the methods and techniques described above may be used solely within an enterprise without offering resources 100 to external customers. For example, in a large enterprise, the cost of resources 100 may be allocated to individual business units using incentives and/or dynamic pricing, as described above, in order to encourage level resource utilization across the enterprise.

Exemplary Computer System Embodiment

In some embodiments, any of the methods or techniques described above may be implemented as program instructions and data capable of being stored or conveyed via a computer-accessible medium. Such methods or techniques may include, for example and without limitation, the various methods of offering resource utilization incentives to customers illustrated in FIGS. 4-6 as well as the method of dynamic resource utilization pricing illustrated in FIG. 7. Such program instructions may be executed to perform a particular computational function, such as receiving and processing resource utilization requests (e.g., web services requests), performing utilization predictions, determining resource utilization status, determining incentives to be offered, operating system functionality, application functionality, and/or any other suitable functions. As noted above, in some embodiments such program instructions may be implemented as utilization prediction logic 235 that may be executable on, e.g., web services gateway 230 and/or servers 210.

Figure 8:
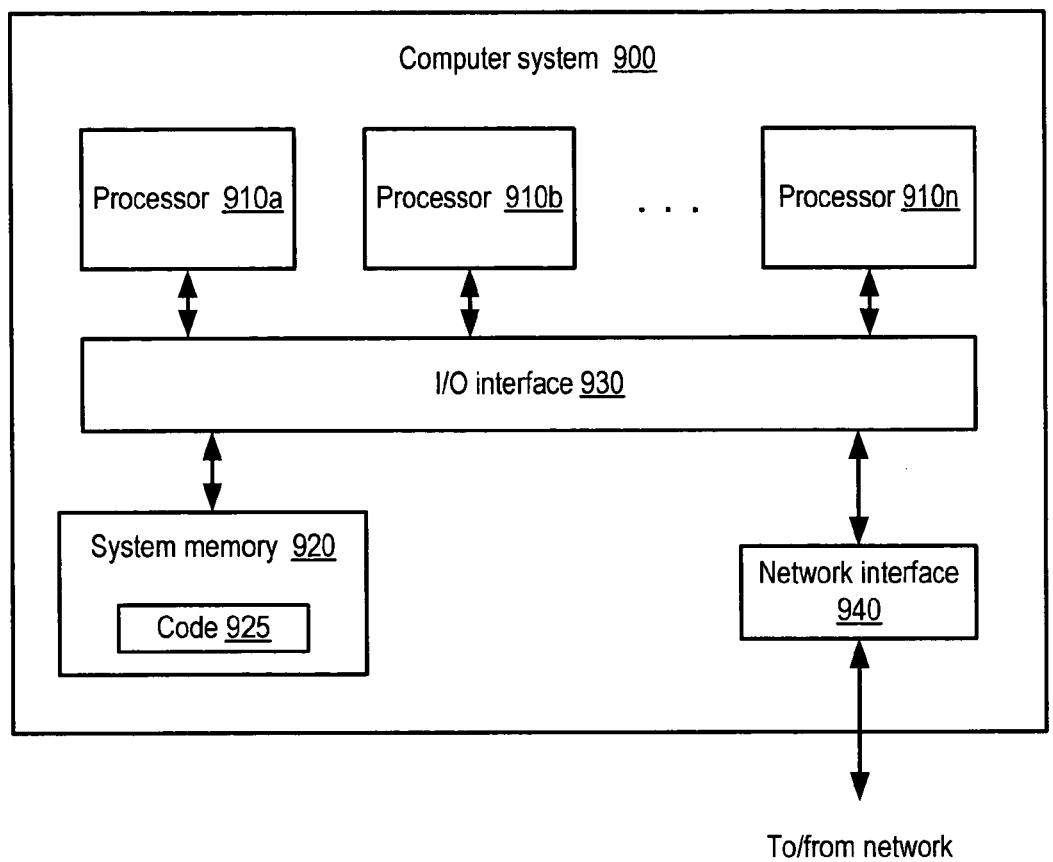
FIG. 8 is a block diagram illustrating an exemplary embodiment of a computer system.

One exemplary embodiment of a computer system including computer-accessible media is illustrated in FIG. 8. In the illustrated embodiment, computer system 900 includes one or more processors 910 coupled to a system memory 920 via an input/output (I/O) interface 930. Computer system 900 further includes a network interface 940 coupled to I/O interface 930. Computer system 900 may be illustrative of one embodiment of server systems 210, web services gateway 230, or customer systems 250, although the specific configuration of computer system 900 may vary for different embodiments of these systems. In one embodiment, computer system 900 may also correspond to computing resource 100 itself.

In various embodiments computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by process 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 920 as code 925.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network, such as other computer systems, for example. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or CD/DVD coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. Further, a computer-accessible medium may be accessible via transmission media or signals such as electrical, electromagnetic, or digital signals, conveyed via a communication medium such as a network and/or a wireless link, such as may be implemented via network interface 940.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
   a computer system dynamically predicting utilization of a computing resource that is expected to occur during a given interval of time, wherein said computing resource is provisioned according to a given level of resource utilization;
   dependent upon dynamically predicting the utilization of said computing resource, said computer system dynamically setting a current price associated with utilization of said computing resource;
   said computer system conveying the current price associated with utilization of said computing resource to a customer via a web services interface, wherein the web services interface implements a platform-independent application programming interface (API);
   said computer system receiving, via the web services interface, a request from the customer to utilize said computing resource, wherein the request indicates a specified price; and
   dependent upon said computer system comparing the current price and the specified price, said computer system causing the customer's request to utilize said computing resource to be performed.

2. The method as recited in claim 1, wherein said computing resource is a virtualized computing resource that includes at least one of a virtual storage device, a virtual network communication device, or a virtual processor.

3. The method as recited in claim 1, wherein said computing resource includes a human task performer.

4. The method as recited in claim 1, wherein said web services interface is configured to receive, via a web-based data transfer protocol, web services requests formatted as platform-independent structured data according to one or more of the following protocols: HTML, XML, or SOAP.

5. The method as recited in claim 1, further comprising said computer system electronically offering an incentive to said customer that includes said computer system reducing a cost associated with said computing resource for utilization of said computing resource that occurs during said given interval of time.

6. The method as recited in claim 1, further comprising said computer system electronically offering an incentive to said customer that includes said computer system offering said customer access to an expanded scope of features of said computing resource during said given interval of time.

7. The method as recited in claim 1, further comprising said computer system electronically offering an incentive to said customer that includes said computer system offering said customer access to an improved level of quality of service relative to said customer's default level of quality of service.

8. The method as recited in claim 1, wherein said computer system dynamically predicting utilization of said computing resource is dependent upon historical utilization of said computing resource.

9. The method as recited in claim 1, wherein said computer system dynamically predicting utilization of said computing resource is dependent upon current utilization of said computing resource.

10. The method as recited in claim 1, wherein said computer system dynamically predicting utilization of said computing resource is dependent upon estimating effects of offering an incentive to utilize said computer resource upon said utilization.

11. The method as recited in claim 1, further comprising:
    receiving a request from said customer to subscribe to an incentive notification service; and
    said computer system electronically offering an incentive to said customer via said incentive notification service.

12. The method as recited in claim 11, wherein said incentive notification service is implemented as a web service.

13. The method as recited in claim 11, wherein said customer's request to subscribe to said incentive notification service includes said customer specifying one or more constraints, and wherein said computer system electronically offering said incentive to said customer is dependent upon whether said incentive satisfies said one or more constraints.

14. The method as recited in claim 1, further comprising:
    said computer system updating said current price and, subsequent to said updating, determining that said current price no longer satisfies the specified price; and
    in response to determining that said current price no longer satisfies the specified price, said computer system causing the customer's request to utilize said computing resource to be suspended.

15. The method as recited in claim 1, further comprising:
    said computer system detecting said customer utilizing said computing resource during said given interval of time;
    in response to detecting that said customer's utilization of said computing resource has continued beyond said given interval of time, said computer system increasing a cost associated with said customer's utilization of said computing resource to a maximum rate.

16. The method as recited in claim 1, wherein said given level of resource utilization corresponds to a total capacity of said computing resource.

17. The method as recited in claim 1, wherein said given level of resource utilization corresponds to a maximum expected utilization of said computing resource.

18. The method as recited in claim 1, wherein said given level of resource utilization is determined according to terms of service of a provider of said computing resource.

19. The method as recited in claim 1, further comprising said computer system dynamically determining, dependent upon predicted utilization of the computing resource, one or more parameters other than price associated with utilization of the computing resource.

20. The method as recited in claim 19, wherein the one or more parameters other than price comprise one or more of: a permitted amount of utilization of the computing device, a quality of service, a duration of utilization of the computing resource, or a granularity with which units of utilization of the computing resource are measured.

21. The method as recited in claim 20, wherein the customer's request indicates one or more specified parameters other than price, and wherein said computer system's causing the customer's request to utilize said computing resource to be performed is further dependent upon comparing the dynamically determined one or more parameters other than price against the one or more specified parameters other than price included in the customer's request.

22. The method as recited in claim 1, wherein said computer system dynamically predicting utilization of said computing resource includes said computer system providing an explicit indication of a prediction of said utilization.

23. The method as recited in claim 1, wherein said computer system dynamically predicting utilization of said computing resource includes said computer system providing an implicit indication of a prediction of said utilization.

24. The method as recited in claim 1, wherein said computer system dynamically predicting utilization of said computing resource includes said computer system providing a prediction based on at least one variable other than historical or current utilization of said computing resource.

25. A computer-readable storage medium storing program instructions, wherein the program instructions are executable to:
dynamically predict utilization of a computing resource that is expected to occur during a given interval of time, wherein said computing resource is provisioned according to a given level of resource utilization; and
dependent upon dynamically predicting the utilization of said computing resource, dynamically set a current price associated with utilization of said computing resource;
convey the current price associated with utilization of said computing resource to a customer via a web services interface, wherein the web services interface implements a platform-independent application programming interface (API);
receive, via the web services interface, a request from the customer to utilize said computing resource; and
dependent upon the current price, cause the customer's request to utilize said computing resource to be performed.

26. The computer-readable storage medium as recited in claim 25, wherein said computing resource is a virtualized computing resource that includes at least one of a virtual storage device, a virtual network communication device, or a virtual processor.

27. The computer-readable storage medium as recited in claim 25, wherein said computing resource includes a human task performer.

28. The computer-readable storage medium as recited in claim 25, wherein said program instructions are further executable to implement the web services interface, wherein said web services interface is configured to receive, via a web-based data transfer protocol, web services requests formatted as platform-independent structured data according to one or more of the following protocols: HTML, XML, or SOAP.

29. The computer-readable storage medium as recited in claim 25, wherein the program instructions are further executable to offer an incentive to said customer that includes a reduction of a cost associated with said computing resource for utilization of said computing resource that occurs during said given interval of time.

30. The computer-readable storage medium as recited in claim 25, wherein the program instructions are further executable to offer an incentive to said customer that includes an offer of access to an expanded scope of features of said computing resource during said given interval of time.

31. The computer-readable storage medium as recited in claim 25, wherein the program instructions are further executable to offer an incentive to said customer that includes an offer of access to an improved level of quality of service relative to said customer's default level of quality of service.

32. The computer-readable storage medium as recited in claim 25, wherein to dynamically predict utilization of said computing resource, the program instructions are further executable to predict said utilization dependent upon historical utilization of said computing resource.

33. The computer-readable storage medium as recited in claim 25, wherein to dynamically predict utilization of said computing resource, the program instructions are further executable to predict said utilization dependent upon current utilization of said computing resource.

34. The computer-readable storage medium as recited in claim 25, wherein to dynamically predict utilization of said computing resource, the program instructions are further executable to predict said utilization dependent upon estimating effects of offering an incentive to utilize said computer resource upon said utilization.

35. The computer-readable storage medium as recited in claim 25, wherein said program instructions are further executable to:
implement an incentive notification service;
detect that said customer has subscribed to said incentive notification service and
offer an incentive to said customer via said incentive notification service.

36. The computer-readable storage medium as recited in claim 35, wherein said incentive notification service is implemented as a web service.

37. The computer-readable storage medium as recited in claim 35, wherein to detect that said customer has subscribed to said incentive notification service, the program instructions are further executable to detect that said customer has specified one or more constraints, and wherein to offer said incentive to said customer, the program instructions are further executable to determine whether said incentive satisfies said one or more constraints.

38. The computer-readable storage medium as recited in claim 25, wherein the customer's request to utilize the computing resource includes a specified price, wherein the program instructions are further executable to cause the customer's request to utilize said computing resource to be performed dependent upon a comparison of the current price and the specified price, and wherein the program instructions are further executable to:
update said current price and, subsequent to an update of the current price, determine that said current price no longer satisfies the specified price; and
in response to determining that said current price no longer satisfies the specified price, cause the customer's request to utilize said computing resource to be suspended.

39. The computer-readable storage medium as recited in claim 25, wherein the program instructions are further executable to:
detect said customer's utilization of said computing resource during said given interval of time; and in response to detecting that said customer's utilization of said computing resource has continued beyond said given interval of time, increase a cost associated with said customer's utilization of said computing resource to a maximum rate.

40. The computer-readable storage medium as recited in claim 25, wherein said given level of resource utilization corresponds to a total capacity of said computing resource.

41. The computer-readable storage medium as recited in claim 25, wherein said given level of resource utilization corresponds to a maximum expected utilization of said computing resource.

42. The computer-readable storage medium as recited in claim 25, wherein said given level of resource utilization is determined according to terms of service of a provider of said computing resource.

43. The computer-readable storage medium as recited in claim 25, wherein the program instructions are further executable to dynamically determine, dependent upon predicted utilization of the computing resource, one or more parameters other than price associated with utilization of the computing resource.

44. The computer-readable storage medium as recited in claim 43, wherein the one or more parameters other than price comprise one or more of: a permitted amount of utilization of the computing device, a quality of service, a duration of utilization of the computing resource, or a granularity with which units of utilization of the computing resource are measured.

45. The computer-readable storage medium as recited in claim 44, wherein the customer's request indicates one or more specified parameters other than price, and wherein to cause the customer's request to utilize said computing resource to be performed, the program instructions are further executable to compare the dynamically determined one or more parameters other than price against the one or more specified parameters other than price included in the customer's request.

46. The computer-readable storage medium as recited in claim 25, wherein to dynamically predict utilization of said computing resource, the program instructions are further executable to provide an explicit indication of a prediction of said utilization.

47. The computer-readable storage medium as recited in claim 25, wherein to dynamically predict utilization of said computing resource, the program instructions are further executable to provide an implicit indication of a prediction of said utilization.

48. The computer-readable storage medium as recited in claim 25, wherein to dynamically predict utilization of said computing resource, the program instructions are further executable to provide a prediction based on at least one variable other than historical or current utilization of said computing resource.

49. A system, comprising:
a system memory; and
a processor coupled to said system memory and configured to execute program instructions, wherein the program instructions are executable to:
dynamically predict utilization of a computing resource that is expected to occur during a given interval of time, wherein said computing resource is provisioned according to a given level of resource utilization; and
dependent upon dynamically predicting the utilization of said computing resource, dynamically set a current price associated with utilization of said computing resource;

receive, via a web services interface, a request from a customer to subscribe to a notification service, wherein the web services interface implements a platform-independent application programming interface (API);
convey, via the notification service, the current price associated with utilization of said computing resource to the customer;
receive, via the web services interface, a request from the customer to utilize said computing resource; and
dependent upon the current price, cause the customer's request to utilize said computing resource to be performed.

50. The system as recited in claim 49, wherein said computing resource is a virtualized computing resource that includes at least one of a virtual storage device, a virtual network communication device, or a virtual processor.

51. The system as recited in claim 49, wherein said computing resource includes a human task performer.

52. The system as recited in claim 49, wherein said program instructions are further executable to implement the web services interface, wherein said web services interface is configured to receive, via a web-based data transfer protocol, web services requests formatted as platform-independent structured data according to one or more of the following protocols: HTML, XML, or SOAP.

53. The system as recited in claim 49, wherein the program instructions are further executable to offer an incentive to said customer that includes a reduction of a cost associated with said computing resource for utilization of said computing resource that occurs during said given interval of time.

54. The system as recited in claim 49, wherein the program instructions are further executable to offer an incentive to said customer that includes an offer of access to an expanded scope of features of said computing resource during said given interval of time.

55. The system as recited in claim 49, wherein the program instructions are further executable to offer an incentive to said customer that includes an offer of access to an improved level of quality of service relative to said customer's default level of quality of service.

56. The system as recited in claim 49, wherein to dynamically predict utilization of said computing resource, the program instructions are further executable to predict said utilization dependent upon historical utilization of said computing resource.

57. The system as recited in claim 49, wherein to dynamically predict utilization of said computing resource, the program instructions are further executable to predict said utilization dependent upon current utilization of said computing resource.

58. The system as recited in claim 49, wherein to dynamically predict utilization of said computing resource, the program instructions are further executable to predict said utilization dependent upon estimating effects of offering an incentive to utilize said computer resource upon said utilization.

59. The system as recited in claim 49, wherein the customer's request to utilize the computing resource includes a specified price, wherein the program instructions are further executable to cause the customer's request to utilize said computing resource to be performed dependent upon a comparison of the current price and the specified price, and wherein the program instructions are further executable to:
update said current price and, subsequent to an update of the current price, determine that said current price no longer satisfies the specified price; and in response to determining that said current price no longer satisfies the specified price, cause the customer's request to utilize said computing resource to be suspended.

60. The system as recited in claim 49, wherein the program instructions are further executable to:

detect said customer's utilization of said computing resource during said given interval of time; and in response to detecting that said customer's utilization of said computing resource has continued beyond said given interval of time, increase a cost associated with said customer's utilization of said computing resource to a maximum rate.

61. The system as recited in claim 49, wherein said given level of resource utilization corresponds to a total capacity of said computing resource.

62. The system as recited in claim 49, wherein said given level of resource utilization corresponds to a maximum expected utilization of said computing resource.

63. The system as recited in claim 49, wherein said given level of resource utilization is determined according to terms of service of a provider of said computing resource.

64. The system as recited in claim 49, wherein the program instructions are further executable to dynamically determine, dependent upon predicted utilization of the computing resource, one or more parameters other than price associated with utilization of the computing resource.

65. The system as recited in claim 64, wherein the one or more parameters other than price comprise one or more of: a permitted amount of utilization of the computing device, a quality of service, a duration of utilization of the computing resource, or a granularity with which units of utilization of the computing resource are measured.

66. The system as recited in claim 65, wherein the customer's request to utilize the computing resource indicates one or more specified parameters other than price, and wherein to cause the customer's request to utilize said computing resource to be performed, the program instructions are further executable to compare the dynamically determined one or more parameters other than price against the one or more specified parameters other than price included in the customer's request.

67. The system as recited in claim 49, wherein to dynamically predict utilization of said computing resource, the program instructions are further executable to provide an explicit indication of a prediction of said utilization.

68. The system as recited in claim 49, wherein to dynamically predict utilization of said computing resource, the program instructions are further executable to provide an implicit indication of a prediction of said utilization.

69. The system as recited in claim 49, wherein to dynamically predict utilization of said computing resource, the program instructions are further executable to provide a prediction based on at least one variable other than historical or current utilization of said computing resource.

\* \* \* \* \*